# United States Patent Office 3,341,303
Patented Sept. 12, 1967

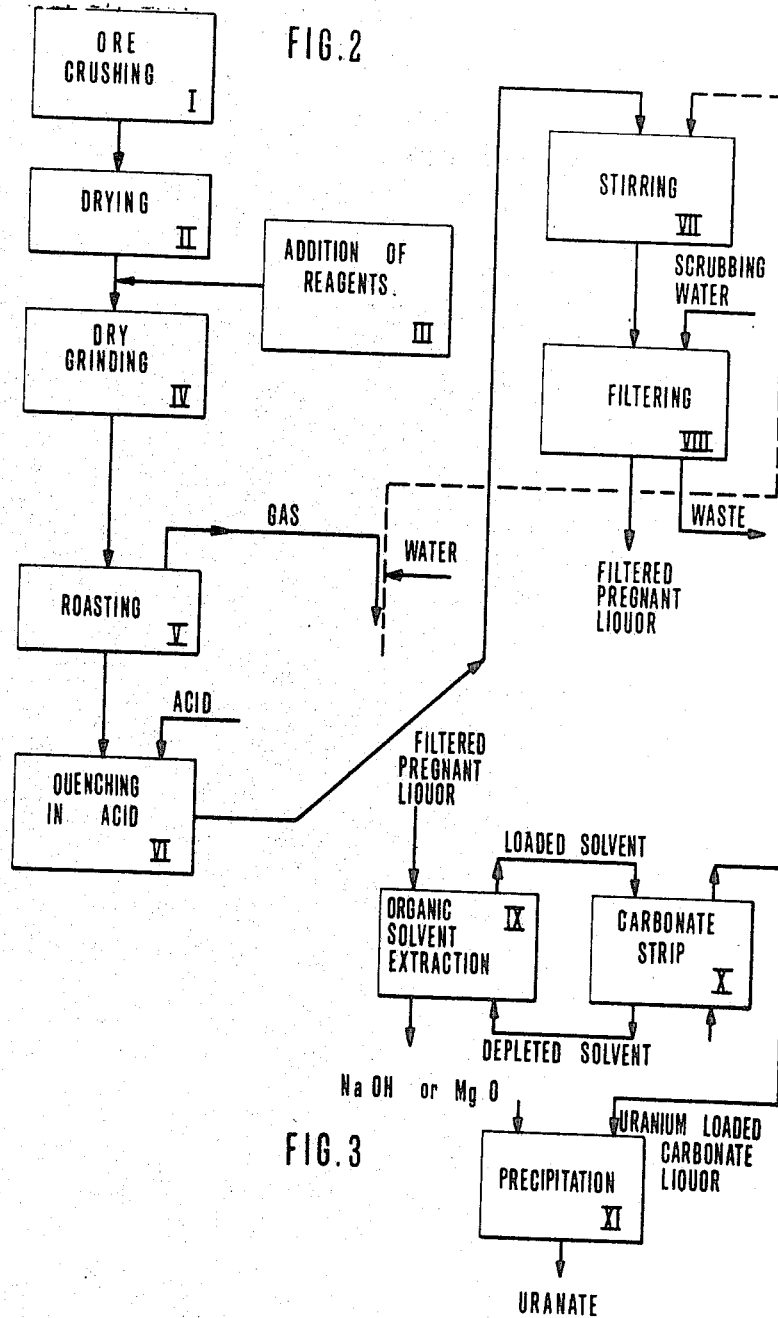

3,341,303
PROCESS FOR THE CONCENTRATION OF URANIFEROUS ORES
Rino Berri, Chatillon-sous-Bagneux, Emile Roques, Versailles, Ernest Sialino, Marly-le-Roi, and Jean Vial, Clamart, France, assignors to Commissariat à l'Energie Atomique, Paris, France
Filed Jan. 17, 1966, Ser. No. 521,180
Claims priority, application France, Jan. 22, 1965, 3,042
10 Claims. (Cl. 23—321)

This invention relates to a process for the concentration of refractory uraniferous ores which cannot economically be treated by conventional processes, either on account of excessive reagent consumption or owing to the need of leaching under pressure in the presence of oxygen.

The invention is of particular interest for processing uraniferous ores in which uranium is present in the tetravalent state as oxides, silicates or organic uranium complexes which are in a highly divided state and locked in silico-aluminates and/or basic carbonate gangues such as Permian sandstone. It should be noted that the term "organic uranium complex" (e.g., carburan, which is similar in composition to the mineral known as thucholite) is understood to mean blends of hydrocarbons with uranium-containing compounds.

Among the refractory ores mentioned above which do not lend themselves to direct treatment by conventional industrial processes, examples can be found such as those which carry a high proportion of carbonate gangue ($CO_2$ content frequently higher than 7%) as well as a fine uraniferous mineralization which contains the metal in the tetravalent state. And carbonate gangues, which are usually composed of complex carbonates of alkaline earths, iron and so forth, interfere with direct sulphuric acid leaching and thus result in excessive acid consumption. However, it is not possible as a rule to separate the gangues prior to leaching when resorting to the usual methods of ore preparation, such as flotation. Generally speaking, when tetravalent uranium is locked in a highly divided state within gangues or carbonaceous matter, a veritable molecular sieve is formed which prevents the direct recovery of uranium by leaching, even after grinding to an extremely fine particle size. In any case, a grinding operation performed after leaching would in fact produce a virtually unfilterable sludge.

Ores corresponding to the above characteristics are formed in many sedimentary deposits, lacustrine formations and the like. This is the case of uranium dissolved in the hexavalent state which has been carried away as a result of the scouring action of surface waters on granite rocks, finally collecting at the horizon of the prevailing water table, frequently together with carbonaceous matter. In a subsequent process, the uranium was then reduced from the hexavalent state to the tetravalent state and settled at the same time as minerals which cannot readily be leached by acids. Uranium in the tetravalent state can be present, for example, in the form of hydrous silicate accompanied by carbonates, siliceous material (and in certain cases free silica), silico-aluminous materials, animal or vegetable refuse, and so forth.

The ores referred-to cannot be processed economically by any one of the conventional methods: grinding, even to a very fine particle size, does not liberate the uranium compounds by reason of their dispersion. Direct sulphuric acid leaching entails a very high acid consumption (300 to 400 kgs./t.). Neither is it possible to adopt the technique used in the United States for processing uranium and vanadium ores; this technique consists in roasting the ore mixed with sodium chloride at 800° C. (with a view to improving the solubility of vanadium-containing ores without substantially modifying the solubility of uranium), then in carrying out a conventional carbonate leaching process. In fact, this technique is limited to the case of complex uranium and vanadium ores. This holds true because the uranium complex which is produced during the calcining process (and which is probably close to an alkali or alkaline-earth uranyl vanadate) must contain vanadium in order to be soluble.

Among the other processes which have already been proposed for processing schistous ores, none is applicable to the types of ore which have been defined above.

For example, it has been proposed to break up the silica-containing ores by the combined action of gaseous elements in the nascent state (such as nitric acid vapors, chlorine vapors, sulphuric acid vapors) on a mixture of the pulverized ore and alkali chlorides. The metallic element, which can be uranium, is in fact liberated but the sludge which results from this attacking action is practically unfilterable, particularly if the ore contains mica.

Another method has also been proposed for extracting uranium from aluminous schists containing neither free silica nor alkaline earths; this method essentially consists in roasting the schists in a reducing atmosphere in the presence of halide compounds of an alkali metal and/or an alkaline earth metal, followed by leaching of the resulting product by an acid; the reducing roasting process causes the iron to change to the bivalent state or even reduces it to the metallic state. Subsequent solvent processing dissolves the iron to the bivalent state.

This process is impracticable in the case of the invention since it again entails breaking-up of the gangue or matrix which, in the case of the ores hereinabove defined, also results in a solution which cannot be filtered.

Finally, yet another uranium extraction process has been proposed whereby the ore, to which is added an alkaline salt (such as sodium chloride), is roasted in the presence of alkali sulphates or of salts which are capable of being converted to sulphates during the roasting process. The sulphur dioxide which is derived from the sulphate initiates the conversion of the alkaline-earth carbonates into sulphate while at the same time rendering the iron insoluble and discharging the carbon dioxide gas which is derived from the carbonate. When applied to ores which do not contain a sufficiently high proportion of free silica, this process would not permit the possibility of locking insoluble alkaline earths in a new cohesive gangue (matrix). As a consequence, the solution produced by leaching with sulphuric acid after roasting would in practice be again unfilterable.

The invention is directed to the basic concept of a process for the concentration of uraniferous ores for which conventional industrial processes cannot be employed. This process accordingly makes it possible to convert the natural ore into an intermediate product which can be considered as a new or modified ore, in which uranium is present as a hexavalent compound and in which it is no longer locked (and can therefore be readily dissolved); in the modified ore referred to, all of the gangue matter has been transformed into a cohesive, well-defined and water-repellent mass which cannot be attacked by the reagents under those processing conditions which enable the uranium to pass into solution. This new matrix remains intact, and the separation of the uranium-loaded solution sets no problem.

With this end in view, the invention proposes a concentration process which consists in grinding the ore and in incorporating addition reagents with the ground ore in proportions such that, during a subsequent pyrometallurgical treatment, the silico-aluminates and/or basic gangues are transformed into a new matrix which is capable of undergoing treatment with the acid used for dissolving the uranium.

The final acid treatment is relatively conventional and can even be simplified with respect to the processes which are usually employed, inasmuch as the pyrometallurgical treatment (roasting or calcining) has a beneficial effect on the flocculation characteristics.

The reagents which are added for the purpose of adjusting the mixture are of a different nature and in different proportions according to the composition of the gangue; in particular, the reagents can comprise:

A sulphur compound such as pyrite or gypsum in a proportion such that the percentage by weight of sulphur contained in the mixture of ore and reagents is comprised between 1.5 and 4% and preferably in the vicinity of 2.5%, the addition of said sulphur compound being intended to ensure the locking of the alkaline-earth bases derived from the gangues; the sulphur itself cannot be employed alone inasmuch as the acid attacking action would rapidly cease as a result of the formation of a protective coating;

A chlorine compound such as sodium chloride or calcium chloride in a proportion such that the percentage by weight of chlorine contained in the mixture of ore and reagents is higher than 3%, the chlorine being mainly intended to ensure the solubilization of the uranium but also to take part in the transformation of the gangue, as will be explained hereinafter;

If necessary, an addition of free silica for the purpose of adjusting the proportion by weight of free silica contained in the mixture of ore and reagents to a value such that said proportion of free silica is at least double that of $CO_2$ (inasmuch as the gangue of certain ores has itself a sufficiently high content of free silica not to require any addition of this latter).

The pyrometallurgical treatment which follows the addition of reagents can be carried out by means of any one of a number of different methods and different types of furnace. However, this treatment will in all cases consist in maintaining the mixture at a temperature within the range of 750° to 900° C. and preferably in the vicinity of 850° C. over a period of time varying between one and two hours.

The reactions which take place during the heat treatment are highly complex and not yet perfectly understood. An attempt will nevertheless be made in the following paragraphs to define the chemical processes involved on the basis of certain assumptions, although it will be understood that the explanations suggested below are given only by way of general outline, and do not claim to be an exact reflection of the phenomena which in fact occur.

(1) *Locking of the alkaline earths (which are present as carbonates in the gangues).*—Sulphur, which will be assumed hereinafter to be introduced in the form of pyrite, and free silica which is present in the ore or added during adjustment of reagents, are employed for the purpose of converting the alkaline-earth carbonates $MCO_3$ (and possibly other carbonates such as iron carbonate, for example) into silicates and sulphates with evolution of $CO_2$. The complete reaction, as carried on in an oxidizing atmosphere, can be written:

(1) 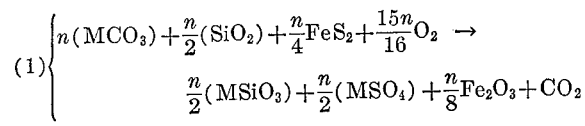

The first three terms of the second member constitute the essential part of the composition of the modified water-repellent matrix which affords resistance to subsequent leaching by an acid solution used for the purpose of dissolving the uranium.

The formula given above does not take into account the action of chlorine which is added in the form of alkali chlorides; in fact, said chlorine is regenerated during the reaction and therefore does not appear in the equation, although it does have an important function in view of the fact that the nascent chlorine (which is displaced from NaCl by the sulphur) acts on the alkaline-earth carbonates so as to convert them into chlorides with evolution of carbon dioxide gas. These chlorides in turn react with the alkali sulphates which are produced as a result of the attacking action of sulphur on the chloride and give rise to alkaline-earth sulphates.

On the other hand, the free silica and the chlorine react so as to form an alkali silicate which converts a proportion of the alkaline-earth sulphates into soluble silicates.

(2) *Solubilization of uranium.*—The chlorine extracts the uranium from the sterile matrix by producing an oxidizing action in the chloride state. It can be considered that the following reaction takes place in the case (given by way of example) in which the uranium is present in the ore in the state of the oxide $UO_2$:

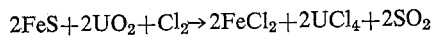

Iron is present in the form of $Fe_2O_3$ (even at moderate temperature) and in the form $FeCl_3$ (which produces nascent chlorine at and above 360° C.) and performs the function of oxidizing agent, thereby facilitating the reaction instead of stopping it. The reactions probably also give rise to the formation of $UO_2Cl_2$ which redecomposes at and above 700° C. and produces $UCl_4$, $UCl_6$, then $U_3O_8$ which re-chloridizes into $UO_2Cl_2$.

The uranium must then be stabilized in the state of sulphate in order to be prevented from reverting to the state of silicate or even to the metallic state; this condition again calls for the presence of sulphur, if necessary in the form of alkali sulphates derived from Reaction 1.

It is reasonable to surmise that the formation of the new cohesive and water-repellent matrix involves the following process: the silico-aluminates have sites in which $Al^{+++}$ has replaced a $Si^{++++}$; between the dipoles formed by these sites, there appear "bridges" which are constituted by alkaline earths (Ca, Mg . . .).

The structure is consolidated by the silicates in which the free silica has locked alkaline earths.

By virtue of the interaction produced between the gangues and the additional reagents, the process according to the invention accordingly restores the uranium to the soluble hexavalent state in a very short time and converts the gangues at the same time. The invention also provides further advantages, and in particular the following:

(1) It liberates the uranium and consequently permits of rapid and practically complete dissolution of the uranium during the acid leaching stage which follows the pyrometallurgical treatment.

(2) The roasting process (pyrometallurgical treatment) assists subsequent flocculation, and therefore also assists the liquid-solid separation process and the purification of the liquor which contains the uranium in solution.

(3) It locks within the modified sterile matrix a large number of elements which constitute objectionable impurities in the conventional treatment and which are present in too small quantities to permit of economic recovery, e.g., transition metals, especially iron, molybdenum, cobalt, nickel; instead of passing into solution, these metals remain in the filters.

The invention is further directed to the novel industrial product provided as in-process material by the modified sterile matrix, which permits of uranium extraction and which is obtained as a result of grinding, addition of reagents and pyrometallurgical treatment. The invention also consists in other arrangements which can advantageously be adopted in conjunction with the preceding but which can also be utilized independently thereof. All of these arrangements will become more readily apparent from the following description of two alternative forms of the process according to the invention which are given solely by way of example and not in any limiting sense. These two alternative forms correspond to the practical application of the pyrometallurgical process, namely in one exemplified form of embodiment to the utilization of an open-hearth furnace and in the other form of embodiment to the utilization of a rotary furnace.

Reference is made in the description to the accompanying drawings, in which:

FIG. 2 is a schematic presentation of a plant which indicates the principal stages of the process according to the invention, corresponding to the utilization of an open-hearth furnace;

FIG. 3 is a schematic presentation of a plant for the extraction of uranium from the solution produced by the process which is illustrated in FIG. 2;

Figure 1:
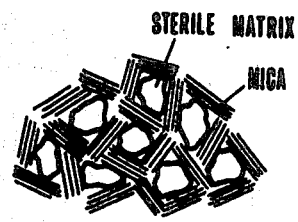
FIG. 1 illustrates in highly diagrammatic form one possible case of formation of one of the ores to which the invention is applicable.

The uranium ore which is shown diagrammatically on a very large scale in FIG. 1 consists of micro-grains of ankerite (a triple carbonate of iron, magnesium and calcium), each grain being surrounded by a layer of fine sheets of micro-mica which virtually constitute a molecular sieve. The uranium which is present in combination in the tetravalent state is locked between said micro-mica sheets and its state of division is such that it cannot be dissolved by conventional processes, even when the ore has previously been ground to an extremely fine particle size.

The successive steps of the process are shown in FIGS. 2 and 3. The first step consists in crushing the blocks of ore (operation I). The crushed ore is then dried (operation II) and reagents are then added thereto (operation III) prior to grinding of the mixture. The added reagents can be split up into two groups: one group has the function of locking the bases which are present within the gangues whilst the other group is intended to produce the solubilization of the uranium.

Locking of the alkaline earths is effected by incorporation of sulphur compounds such as pyrite $FeS_2$ which are intended to supply $SO_4$ ions for attacking alkaline-earth carbonate gangues in proportions such that the proportion by weight of sulphur contained in the mixture of ore and reagents is comprised between 1.5 and 4%.

When the proportion of carbonate gangues is fairly low (the proportion of $CO_2$ contained in the ore being between 5 and 9%), the pyrite is advantageously replaced by gypsum (calcium sulphate) in view of the fact that the presence of an alkaline earth is essential for the purpose of consolidating the intermediate sterile matrix. Solubilization of the uranium is ensured by adding to the ore a chlorine reagent such as sodium chloride or calcium chloride. The minimum proportion by weight of chlorine contained in the mixture of ore and reagents must be higher than 3%.

In the case of ores which contain an insufficient proportion of free silica, it is necessary to adjust said proportion by incorporation of an addition reagent which is intended to bring the proportion by weight of free silica to a value which is at least double that $CO_2$.

Generally speaking, and depending on the composition of the ore being processed and especially on its percentage content of mineral carbonates and of free silica, each of the reagents referred to above represents between 3 and 10% of the mixture.

The mixture of reagents and ore which is obtained is ground in the dry state to a particle size such that the quantity of material rejected as oversize after the mixture has been passed through a 200 µ-mesh screen represents a percentage of no more than a few units (operation IV) and the powdery mixture is then subjected to a pyrometallurgical treatment in an open-hearth furnace (operation V). This treatment consists of a relatively slow preheating up to approximately 850° C., followed by roasting at this temperature which is maintained for a period of one and one-half of two hours.

The temperature range within which the roasting process can be carried out extends from approximately 750° C. to 900° C.: below the bottom value, the reactions are not carried on to a sufficient extent; above 900° C., the favorable reactions which take place are interfered with by parasitic reactions between gangues of different nature.

The gases which pass out of the furnace during the calcining operation can usefully be collected and scrubbed with water so as to recover the entrained acids. This acidified water can then be utilized in a later stage of the process.

The roasting process (operation V in FIG. 2) is followed by an acid quench (operation VI). The roasted mixture, which is delivered from the furnace at a temperature of several hundred degress, is discharged into an aqueous solution of strong mineral acid (usually sulphuric acid). The aqueous solution is preheated to a temperature such that the pulp obtained on completion of the quenching process is at a temperature of the order of 85° C. In fact, quenching in a cold aqueous solution of sulphuric acid would not make it possible to achieve complete insolubilization of the silica, a part of which would be found in the solution in the form of silica gel. The proportion by weight of the roasted mixture to the aqueous solution varies between ½ and ⅔ depending on the temperature at which the treated mixture is discharged, the initial acidity being determined so that the residual free acidity of the pulp is of the order of pH 1 (0.1 N).

The pulp which is obtained is then re-treated by dilution (operation VII) with the acidified gas-scrubbing water derived from operation V (as shown in broken line in FIG. 2). The dilution process is preferably carried on until the pulp obtained contains approximately 50% of solid material. The pulp is then subjected to stirring for a period of time which may vary between thirty minutes and one hour, then subjected to liquid-solid separation by filtering (operation VIII); a filtered liquor loaded with uranyl sulphate which will serve as starting material for the final conventional process will thus be withdrawn together with the waste material which will subsequently be carried away by washing of the filter.

The filtered liquors can be treated by a number of different organic-solvent extraction processes. However, some of the usual organic solvents, especially the amines, cannot be employed owing to the presence of chlorine in the liquor. The process as shown diagrammatically in FIG. 3 makes use of a phosphoric acid ester.

The process which is presented in FIG. 3 consists in extraction by an organic solvent such as, for example, a phosphoric acid ester in a kerosene diluent, by countercurrent flow in a plate fractionating column or in a bank of mixer-settlers (operation IX). The uranium contained in the organic solvent is then stripped by a carbonate solution in a second column or in a second bank of mixer-settlers (operation X). The uranium-loaded liquors derived from the stripping section and containing

$$Na_4UO_2(CO_3)_3$$

are finally subjected to a process of precipitation of the uranium as sodium uranate $Na_2U_2O_7$ or as magnesium uranate $MgU_2O_7$ (operation XI). This part of the process is conventional and descriptions of practical examples can be found elsewhere in the literature, in particular in chapter 3 of the book entitled, "Metallurgy of the Rarer Metals—8 Uranium" (Butterworth, 1963).

Figure 4:
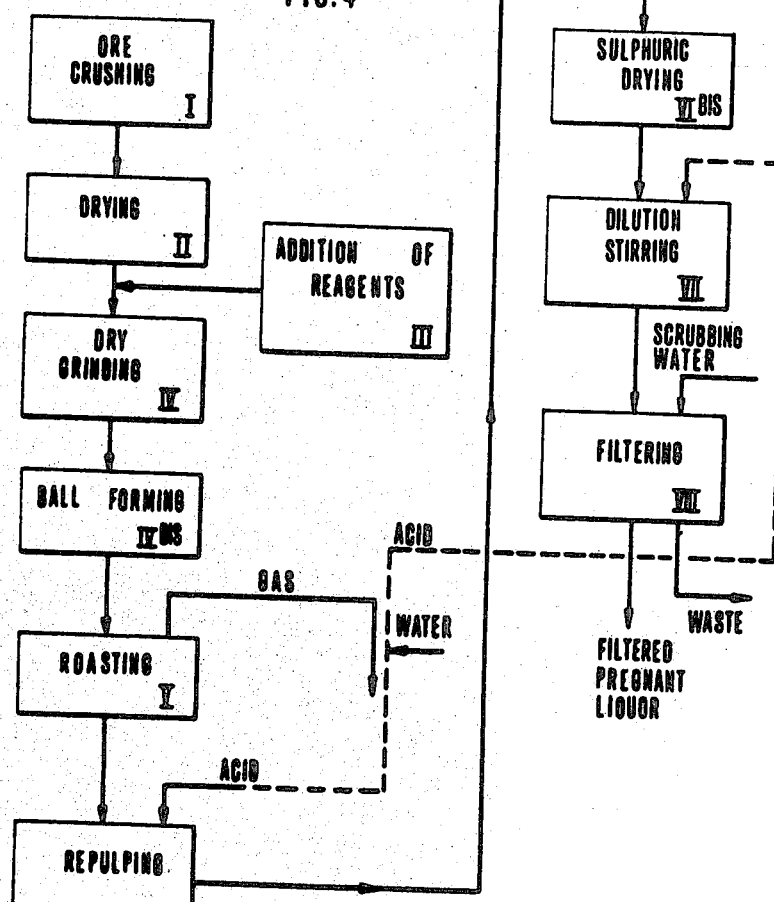
FIG. 4 is a further schematic presentation of a process which constitutes an alternative form of the process shown in FIG. 2 and which corresponds to the utilization of a rotary furnace.

An alternative form of treatment in accordance with the invention which corresponds to the utilization of a rotary furnace is represented diagrammatically in FIG. 4. The first four stages of the process which consist in crushing of the ore, drying, addition of reagents (salt and pyrite or gypsum) and dry grinding are the same (operations I to IV).

The powdered mixture is shaped into balls in a press (operation IV bis). The pyrometallurgical treatment or roasting (operation V) is carried out under the same conditions of temperature as in the previous method of treatment over a period of time which can be shorter (thirty minutes to one hour). The calcined product obtained is disintegrated and converted to pulp by means of an aqueous acid solution; this so-called re-pulping operation corresponds to the acid quenching stage of the process which is represented diagrammatically in FIG. 2.

Re-pulping is carried out with 400 liters of aqueous solution per ton of the calcined product, the total acidity being equivalent to approximately 100 g. per liter of 100% sulphuric acid. In this case also, a part of the solution can consist of the liquors obtained by scrubbing the roasting-process gases with water. In a more general manner, the quantity of acid used is so determined that the final pH value of the pulp obtained is of the order of 1, the consumption of sulphuric acid being of the order of 50 kgs./t. of calcined mixture.

The re-pulping stage (operation VI) must be followed by acid drying (operation VI bis) in order to dehydrate the silica and render it insoluble. The product is then reconverted into pulp by dilution to approximately 50% solid by stirring for a period of time which varies between thirty minutes and one hour; the aqueous acid solution employed in the dilution stirring stage (operation VII) can also be provided by the roasting-gas scrubbing water.

The remainder of the process (liquid-solid separation followed by extraction of the uranium) can be identical with the process which was described earlier in reference to FIG. 3.

By way of example, there will now be given numerical data which correspond to the processing of a specific sample by means of the two methods hereinabove described. Said sample is made up of a mixture in equal parts of three ores A, B and C having the following proportions by weight of their principal elements:

| Elements | Proportions of elements, percent | | |
|---|---|---|---|
|  | Ore A | Ore B | Ore C |
| $SiO_2$ total (of which 30% in the free state) | 49.97 | 42.40 | 49.15 |
| $UO_3$ | 0.14 | 0.29 | 0.31 |
| $CO_2$ | 10.57 | 15.33 | 10.15 |
| $Fe_2O_3$ | 5.05 | 5.27 | 5.43 |
| $SO_3$ | 0.50 | 0.06 | 0.80 |
| Sulphides | 0.015 | 0.05 | 0.075 |
| CaO | 7.66 | 11.58 | 7.60 |
| MgO | 3.90 | 5.03 | 4.32 |
| $Al_2O_3$ | 14.00 | 10.72 | 13.52 |

If the roasting operation is carried out in an open-hearth furnace with two different proportions of addition agents:

|  | NaCl (kgs./t.) | Pyrite (kgs./t.) |
|---|---|---|
| Case (a) | 50 | 50 |
| Case (b) | 200 | 50 |

The yields obtained were as follows, as a function of the roasting temperature $\theta$:

| $\theta$ ° C. | Percentage of uranium extracted | |
|---|---|---|
|  | Case (a) | Case (b) |
| 775 | 86.2 | 89.6 |
| 825 | 89.7 | 95.2 |
| 875 | 91.0 | 95.6 |
| 925 | 86.0 | 95.1 |

In order to determine the influence of the nature of the sulphur addition reagent, comparative tests have been made in which a number of different compounds were utilized (the chlorine addition reagent remains NaCl in a proportion of 100 kgs./t.): the following yields have been obtained, the roasting temperature remaining the same:

| Sulphur compound, kgs./t.: | Percentage of uranium extracted, percent |
|---|---|
| Pyrite, 50 | 93.7 |
| Sulphur, 30 | 90.2 |
| Gysum, 120 | 90.4 |

If the process is compared by employing on the one hand an open-hearth furnace and on the other hand a rotary furnace, it is found that, using the same proportion of reagents (NaCl: 100 kgs./t.; pyrite: 50 kgs./t. at the same roasting temperature, the yields were:

93.7% in the case of roasting in the open-hearth furnace;

91.0% in the case of roasting in the rotary furnace after ball forming.

In all cases, the consumption of sulphuric acid remained low, namely between 30 and 50 kgs./t., depending on whether the aciduous water derived from the scrubbing of gaseous effluents of the roasting process was employed or not.

As will be apparent, the invention is not limited to the examples herein described and the scope of this patent accordingly extends to those alternative forms of either all or a part of the process which remain within the definition of equivalent means.

What we claim is:

1. Pyrometallurgical and chemical process for the concentration of uraniferous ores containing uranium in the tetravalent state as compounds which are locked in a divided state in silico-aluminates and basic carbonate gangues comprising the steps of grinding the ore, then forming a mixture by adding to the ground ore reagents providing additional sulfur, chlorine and free silica, then heating the mixture at a temperature within the range of 750° C. to 900° C., the proportion of said reagents being such that during the heat treatment the silico-aluminates and basic carbonate gangues are converted into a cohesive and water-repellent silico-aluminous matrix and then extracting uranium from said matrix by leaching with an acid solution which does not attack said matrix.

2. Process as described in claim 1, the proportion by weight of said reagent providing an addition of sulfur being between 1.5 and 4%.

3. Process as described in claim 1, the proportion by weight of said reagent providing an addition of chlorine being not less than 3%.

4. Process as described in claim 1, the proportion of free silica being at least twice the proportion of $CO_2$ present in the ore.

5. Process as described in claim 1, said heat treatment consisting of maintaining the mixture at a temperature on the order of 850° C. for from one to two hours.

6. Process as described in claim 1, the mixture being heated in the powdered state and then converting the heated mixture to pulp by quenching in an aqueous solution of strong mineral acid, the proportion by weight of ore mixed with reagents to aqueous solution being between ½ and ⅔ depending upon the outlet temperature of the treated mixture and the initial acidity providing a residual free acidity of the pulp on the order of pH 1 (0.1 N).

7. Process as described in claim 6, the temperature of the aqueous quenching solution being such that the temperature of the pulp is in the vicinity of 90° C.

8. Process as described in claim 1, including the further step of pressing the mixture into balls, then heating said balls of mixture and then converting said heated balls to pulp by mixing the balls with an aqueous solution of sulfuric acid, the proportion by weight of ore mixed with reagents to aqueous solution being on the order of 1⅔ and the initial acidity of the solution providing a residual free acidity of the pulp on the order of pH 1 (0.1 N).

9. Process as described in claim 6, including the further step of disintegrating and diluting the pulp in an acid solution dissolving uranium, then filtering the resulting solution and then extracting uranium from the uranium loaded liquid obtained from the filtering step.

10. Pyrometallurgical and chemical process for the concentration of uraniferous ores containing uranium in the tetravalent state as compounds which are locked in a divided state in silico-aluminate and basic carbonate gangues, the proportion of free silica in said ores being at least twice the proportion of $CO_2$ therein, comprising the steps of grinding the ore, then forming a mixture by adding to the ground ore reagents providing additional sulphur and chlorine, then heating the mixture at a temperature within the range of 750° C. to 900° C., the proportion of said reagents being such that during the heat treatment the silico-aluminates and basic carbonate gangues are converted into a cohesive and water-repellent silico-aluminous matrix and then extracting uranium from said matrix by leaching with an acid solution which does not attack said matrix.

References Cited

UNITED STATES PATENTS

| | | | |
|---|---|---|---|
| 2,785,065 | 3/1957 | Spedding et al. | 75—84.1 X |
| 2,801,915 | 8/1957 | Erasmus | 75—84.1 |
| 2,867,501 | 1/1959 | Hanley | 23—319 |
| 2,890,099 | 6/1959 | Rhodes et al. | 23—319 |

FOREIGN PATENTS 846,360  8/1960  Great Britain.

BENJAMIN R. PADGETT, *Primary Examiner.*

CARL D. QUARFORTH, *Examiner.*

M. J. SCOLNICK, *Assistant Examiner.*